(12) United States Patent
Johnston et al.

(10) Patent No.: US 6,835,126 B1
(45) Date of Patent: Dec. 28, 2004

(54) POULTRY CHILLING AND AGING METHOD AND APPARATUS

(75) Inventors: Patrick Johnston, Cumming, GA (US); Stanley M. Evans, Cumming, GA (US)

(73) Assignee: Tyson Foods, Inc., Springdale, AR (US)

( * ) Notice: Subject to any disclaimer, the term of this patent is extended or adjusted under 35 U.S.C. 154(b) by 20 days.

(21) Appl. No.: 10/084,574

(22) Filed: Feb. 27, 2002

Related U.S. Application Data

(60) Provisional application No. 60/271,920, filed on Feb. 27, 2001.

(51) Int. Cl.[7] ................................................ A22B 5/20
(52) U.S. Cl. ...................................................... 452/163
(58) Field of Search .......................... 452/81, 106, 123, 452/131, 149, 163, 198

(56) References Cited

U.S. PATENT DOCUMENTS

| | | | |
|---|---|---|---|
| 3,240,026 A | | 3/1966 | Van Dolah et al. |
| 3,250,086 A | | 5/1966 | Morris |
| 3,522,058 A | | 7/1970 | Libby |
| 3,715,891 A | | 2/1973 | Martin |
| 3,729,773 A | * | 5/1973 | Dillon ........................ 426/524 |
| 3,874,186 A | * | 4/1975 | Bonuchi et al. ................ 62/63 |
| 4,367,630 A | * | 1/1983 | Bernard et al. ................ 62/63 |
| 4,388,811 A | | 6/1983 | Zebarth |
| 4,593,435 A | | 6/1986 | Martin et al. |
| 4,667,370 A | * | 5/1987 | Brockington et al. ........ 426/524 |
| 4,827,727 A | * | 5/1989 | Caracciolo ..................... 62/63 |
| 4,849,237 A | | 7/1989 | Hurst |
| 5,178,890 A | | 1/1993 | van den Nieuwelaar |
| 5,478,584 A | | 12/1995 | Donohue et al. |
| 5,484,332 A | * | 1/1996 | Leech et al. ................. 452/173 |
| 5,595,066 A | | 1/1997 | Zwanikken et al. |
| 5,868,000 A | | 2/1999 | Morris et al. |
| 5,939,115 A | | 8/1999 | Kounev et al. |
| 6,547,659 B1 | * | 4/2003 | Adachi et al. .............. 452/173 |
| 6,605,308 B2 | * | 8/2003 | Shane et al. ................ 426/332 |

* cited by examiner

*Primary Examiner*—Thomas Price
(74) *Attorney, Agent, or Firm*—Fellers, Snider, Blankenship, Bailey & Tippens; Dennis D. Brown

(57) ABSTRACT

A process and apparatus for chilling and aging the front portions of poultry carcasses. The process and apparatus preferably comprise and provide for (a) separating eviscerated poultry carcasses into front portions and back portions, (b) washing the front portions, (c) conducting a fecal inspection of at least some of the front portions, (d) pre-chilling the front portions in water, (e) delivering the front portions through a reconditioning washer when the fecal inspection indicates that a failure has occurred, and (f) conducting a secondary inspection at the reconditioning wash.

8 Claims, 10 Drawing Sheets

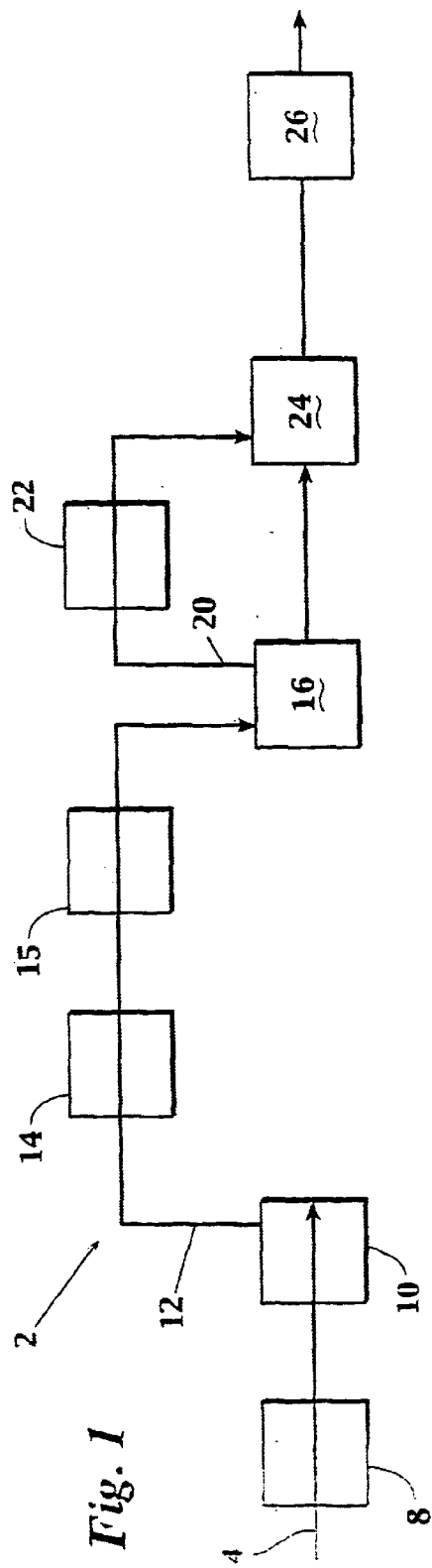
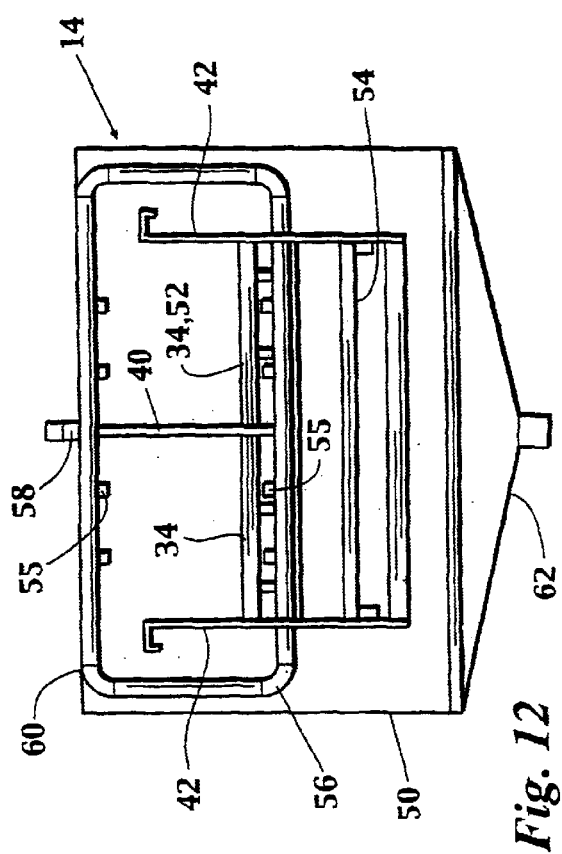

POULTRY CHILLING AND AGING METHOD AND APPARATUS

This patent application claims the benefit of U.S. provisional patent application Ser. No. 60/271,920, filed Feb. 27, 2001.

FIELD OF THE INVENTION

The present invention relates to methods and apparatuses for chilling and aging poultry carcasses. More particularly, but not by way of limitation, the present invention relates to methods and apparatuses for chilling and aging the front half portions of poultry carcasses.

BACKGROUND OF THE INVENTION

When processing chicken, turkey, or other types of poultry, the poultry carcass will commonly be divided laterally to produce a front half product and a back half product. The front half will typically comprise the breasts, keel, wings, and a portion of the back. The back half, or saddle, typically comprises the legs, thighs, and the remainder of the back. Prior to deboning and/or other subsequent processing operations, the front halves of the poultry carcasses will commonly be subjected to aging at reduced temperatures in order to increase the tenderness of the product and facilitate any downstream processing operations.

Aging procedures heretofore used in the art have typically involved the steps of: (a) washing whole, eviscerated carcasses with chlorinated water; (b) conducting a visual zero-tolerance fecal inspection using a sample set of the carcasses; (c) chilling the eviscerated whole carcasses in a chlorinated water medium to a temperature in the range of from about 35° F. to about 40° F.; (d) unloading the whole carcasses from the chiller and hanging the carcasses upside down on a "cut-up shackle" conveyor; (e) delivering the carcasses by means of the shackle conveyor through a primary halving apparatus wherein the front and side skin and meat tissue is cut and the backbone is broken or cut such that the front half of the carcass is left hanging from the back half by substantially only a segment of tissue extending between the front and back sections of the backbone; (f) conducting the carcass through a subsequent, secondary halving apparatus wherein the remaining tissue segment is cut so that the front half is completely separated from the back half; (g) collecting the front halves in batch tubs and aging the front halves by placing the tubs in a refrigerated air cooler for a period in the range of from about 8 to about 10 hours; and then (h) moving the batch tubs of aged product from the cooler to the appropriate downstream processing stations.

Primary and secondary halving apparatuses for poultry carcasses are well known in the art. An example of one type of primary halving apparatus is described in U.S. Pat. No. 4,593,435. The entire disclosure of U.S. Pat. No. 4,593,435 is incorporated herein by reference.

The apparatus described in U.S. Pat. No. 4,593,435 comprises: a tilted, rotating cog wheel having a circumferential array of radially projecting teeth (or fingers); an elongate horizontal auger (referred to in the '435 Patent as a "leg space conveyor") which receives the back (saddle) portions of the carcasses as they are carried by the shackle conveyor and assists the shackle conveyor in moving the carcasses through the halving apparatus; an elongate guide rod generally running parallel to the leg space conveyor; a stationary incision blade which does not rotate with the cog wheel but projects outwardly from a radial gap formed in the wheel; and an inclined conical auger positioned after the cog wheel and rotating counter to the leg space conveyor.

In operation, the shackle conveyor delivers whole, eviscerated poultry carcasses to the apparatus of U.S. Pat. No. 4,593,435 in inverted position such that the backs of the carcasses face outwardly toward the leg space conveyor and the elongate guide rod. The shackle conveyor and leg space conveyor carry the carcasses into the tilted rotating cog wheel such that the carcasses tangentially intersect with the teeth of the cog wheel as the teeth move along the downward portion of their rotational path.

Specifically, as each carcass is delivered into the downward arcuate path of the cog wheel, one of the teeth of the cog wheel contacts the front skin of the carcass covering the evisceration vent and pushes the back of the carcass firmly against the leg space conveyor and the guide rod. The tooth thus operates to stabilize the carcass and to desirably tension both the front skin thereof and the two side breast-to-thigh tissue webs extending between the keel and thighs of the carcass. With the carcass stabilized and tensioned in this manner, it is carried by the cog wheel, the leg space conveyor, and the shackle conveyor into the stationary blade so that the blade cuts transversely through the tensioned front skin and side tissue webs at a point just below the tip of the breast keel.

Following the cutting operation, the shackle conveyor and the leg space conveyor of the U.S. Pat. No. 4,593,435 apparatus carry the carcass into the leading end of the inclined, counter-rotating conical auger so that the conical auger engages the front opening formed by the cutting operation in a manner effective to pull the hanging front half of the carcass downward and bend the front half backward under the elongate guide bar. The inclined conical auger thus operates to effect a further separation of the front and back halves of the carcass by breaking the backbone of the carcass and accomplishing a further pull-tearing of the side tissue webs.

Following the primary halving operation, the front half of the carcass is left hanging from the saddle by substantially only a segment of back skin tissue extending between the forward and rearward sections of the broken backbone. To thus complete the separation of the front half of the carcass from the back half, the carcass will typically be conveyed by the shackle conveyor to a secondary halving apparatus which cuts the remaining tissue extending between the front and back portions of the broken backbone. Some secondary halving devices utilize a rotating circular blade into which the carcasses are guided. Other types of secondary halvers utilize stationary cutting blades.

A secondary halving system 150 of a type commonly employed in the art is depicted in FIGS. 5 and 6. System 150 includes a skin blade 152, a back support member (not shown), and an indexing assembly 156. As the carcasses are delivered from the primary halver to the secondary halver, the indexing assembly 156 operates to receive and to properly orient and position the carcasses for the secondary cutting operation. The indexing assembly 156 also assists in moving the carcasses through skin blade 152.

The particular indexing assembly 156 employed in secondary halving system 150 comprises: a support boom 158; an elongate vertical center shaft 160 rotatably held by boom 158; a chain-drive wheel 162 which is secured at the upper end of center shaft 160 and is engaged by the shackle conveyor drive chain in a manner effective for turning the indexing assembly in coordination with the shackle conveyor; an upper indexing wheel 164 secured on shaft 160 and having fingers 166 projecting radially therefrom for guiding the back half (saddle) of the carcass through the skin blade 152; a similar but larger indexing wheel 168 secured on shaft 160 slightly below upper wheel 164 and having fingers 170 projecting radially therefrom for guiding the loosely hanging front half of the carcass through the skin blade 152.

The typical front half chilling and aging processes employed heretofore have significant shortcomings. Aging the front halves in batch tubs results in: an undesirable degree of product damage due to crushing; significant moisture loss during the batch aging period; high manual labor requirements; employee injuries resulting from tub handling and dumping; undesirable variations in product quality; and increased opportunity for food safety problems or hazards due to handling. Delays between the batch aging process and further downstream processing steps also result in further dehydration and subsequent decreased product yield. Additionally, in the prior chilling and aging processes, any of the carcasses which fail the fecal inspection must be subjected to additional washing processes and then reinspected. This often results in the reinspection of many more birds than necessary (due, in large part, to the lack of a preliminary chilling or batch step of the type provided by the present invention as discussed hereinbelow).

SUMMARY OF THE INVENTION

The present invention provides a continuous process for chilling and aging, and an inventive apparatus therefor, which satisfy the needs and alleviate the problems discussed above. The inventive continuous process and apparatus eliminate batch tub aging procedures, reduce dehydration losses, significantly increase product yield, reduce manual labor requirements and the potential for employee injuries, and significantly improve product safety, quality, and consistency. The front halves processed in accordance with the present invention are automatically conveyed to deboning areas or other downstream processing stations immediately after chilling. Additionally, the inventive system provides for fecal inspection and product reconditioning prior to the primary chilling and aging operation, thus eliminating the need to reinspect products unaffected by the inspection failure. This is achieved in large part by utilizing a preliminary step or pre-chiller to keep smaller batch lots for reinspection prior to the reconditioning stand. Moreover, in contrast to the processes commonly used heretofore, the inventive process and apparatus desirably perform the aging procedure in the presence of a medium which both controls the growth of and reduces microbial populations.

In one aspect, the present invention provides a process for chilling and aging front portions of poultry carcasses. The inventive process comprises the steps of: (a) separating eviscerated poultry carcasses into front portions and back portions; (b) then conducting a fecal inspection of at least some of the front portions; (c) pre-chilling the front portions in water and then (d) chilling and aging the front portions.

The inventive process preferably further comprises the step after step (a) and prior to step (b) of washing the front portions. The inventive process preferably then also comprises the step, after step (c) and prior to step (d) when the fecal inspection of step (b) detects a failure, of delivering the front portions through a reconditioning wash and then to step (d).

In another aspect, the present invention provides an improvement in a primary halving apparatus for poultry carcasses of the type which includes a rotatable cog wheel having a plurality of radially projecting teeth and a stationary blade projecting from a radial gap in the cog wheel. The improvement comprises: (a) a plurality of indexing fingers projecting radially from the cog wheel such that, as the poultry carcasses are continuously delivered to the cog wheel, the indexing fingers orient and index the poultry carcasses for cutting and (b) a stationary guide member for guiding the poultry carcasses into engagement with the cog wheel such that the poultry carcasses will slide along and be supported against the stationary guide member during cutting.

The improvement provided by the present invention to the primary halving apparatus preferably further comprises a center shaft for the cog wheel which has been lengthened to accommodate delivery of the poultry carcasses through the primary halving apparatus on an evisceration shackle conveyor.

In another aspect, the present invention provides an improvement to a secondary halving apparatus for poultry carcasses of the type including a chain drive wheel positioned on a center shaft and a pair of indexing wheels positioned on the center shaft below the chain drive wheel. The improvement comprises: (a) extending the center shaft to accommodate delivery of the poultry carcasses to the secondary halving apparatus by an evisceration shackle conveyor and (b) a third indexing wheel positioned on the center shaft between the chain drive wheel and the pair of indexing wheels. The third indexing wheel has a plurality of indexing fingers projecting radially therefrom.

In another aspect, the present invention provides a conveyor for conveying and washing food items comprising: a pair of adjacent conveyor belts, each having an upper carrying run; a vertical divider positioned between the carrying runs of the conveyor belts; and a wash housing through which at least the carrying runs of the conveyor belts are received. The conveyor belts are preferably independently driven so that either of the conveyor belts can be selectively driven in a direction opposite that of the other.

In yet another aspect, the present invention provides a conveyor for inspecting and washing food items comprising: a first conveyor having an upper carrying run; a wash housing through which at least the carrying run of the first conveyor is received; and a second conveyor positioned below the first conveyor and having a width greater than that of the first conveyor. The inventive conveyor for inspecting and washing preferably further comprises at least one inspection stand positioned adjacent the second conveyor.

Further objects, features, and advantages of the present invention will be apparent to those skilled in the art upon examining the accompanying drawings and upon reading the following description of the preferred embodiments.

BRIEF DESCRIPTION OF THE DRAWINGS

FIG. 1 is a block flow diagram of an embodiment 2 of the inventive chilling and aging system.

FIG. 12 provides an elevational view of the washer 14 employed in inventive apparatus 30.

DETAILED DESCRIPTION OF THE PREFERRED EMBODIMENTS

Figure 2:
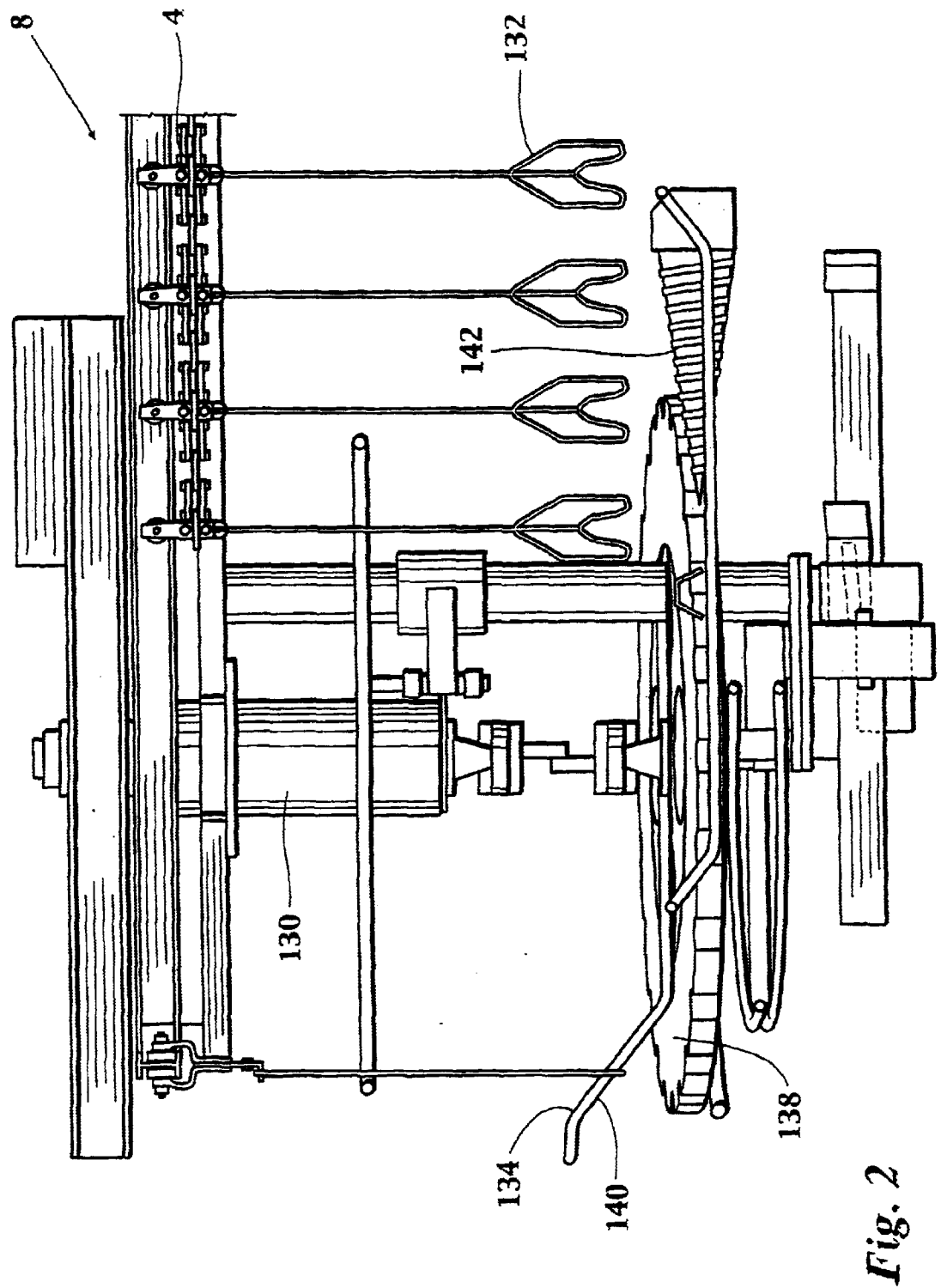
FIG. 2 provides an elevational front view of an embodiment 8 of a primary halving apparatus preferred for use in inventive system 2.

Embodiment 2 of the inventive chilling and aging system is schematically illustrated in FIG. 1. Inventive system 2 preferably comprises: a conveyor system 4 (preferably an evisceration shackle conveyor system) which delivers whole, uncut, eviscerated poultry carcasses to the inventive system; a primary halving apparatus 8 wherein the front skin and side tissue webs of the carcasses are cut and the carcass backbones are broken as the carcasses are conveyed by conveyor system 4 so that the front halves 5 of the carcasses hang loosely from the back halves 7 thereof; a secondary halving apparatus 10 which completes the halving operation so that the front halves 5 of the carcasses are completely separated from the back halves 7; a transfer conveyor 12 onto which the front halves 5 are received as they are separated by secondary halving apparatus 10 from the back halves 7 of the carcasses; a final wash station 14 through which the front halves 5 are preferably conveyed by transfer conveyor 12; a zero-tolerance fecal inspection station 15; a pre-chiller 16 which receives the front halves 5 from transfer conveyor 12 and preferably reduces the temperature of the front halves 5 by an amount of from about 15° F. to about 20° F. and controls lot or batch size for fecal inspection; a secondary inspection conveyor 18 which receives the front halves from pre-chiller 16 and on which a secondary zero-tolerance fecal inspection can be conducted in the event that a failure is detected at the primary inspection station 15; a primary aging chiller 24 which receives the front halves 5 from inspection conveyor 18 and through which the front halves 5 are preferably continuously conveyed for a period of more than 1.5 hours; and a secondary aging chiller 26 through which the front halves 5 are preferably continuously conveyed for a period of at least 3.5 hours.

To deal with situations where failures are detected at the primary zero-tolerance fecal inspection station 15, inventive system 2 includes a reconditioning conveyor 20 to which the stream of front halves 5 can be momentarily diverted. The reconditioning conveyor 20 carries the front halves through a reconditioning wash 22 and then on to primary aging chiller 24.

Generally any type of halving system known in the art can be employed in the present invention. Primary and secondary halving apparatuses 8 and 10 of a type particularly preferred for use in inventive system 2 are described hereinbelow. As indicated above, the halving apparatuses 8 and 10 will preferably be operable for separating the front halves 5 from the back halves 7 of carcasses 3 as the carcasses are being conveyed upside down by an evisceration-type shackle conveyor 4. When separated from back halves 7, the front halves 5 of carcasses 3 will preferably drop via a common chute or similar device onto transfer conveyor 12. The back halves 7, on the other hand, will typically be conveyed by the shackle conveyor system 4 through a chlorinated washing cabinet to a back half chilling area.

Figure 11:
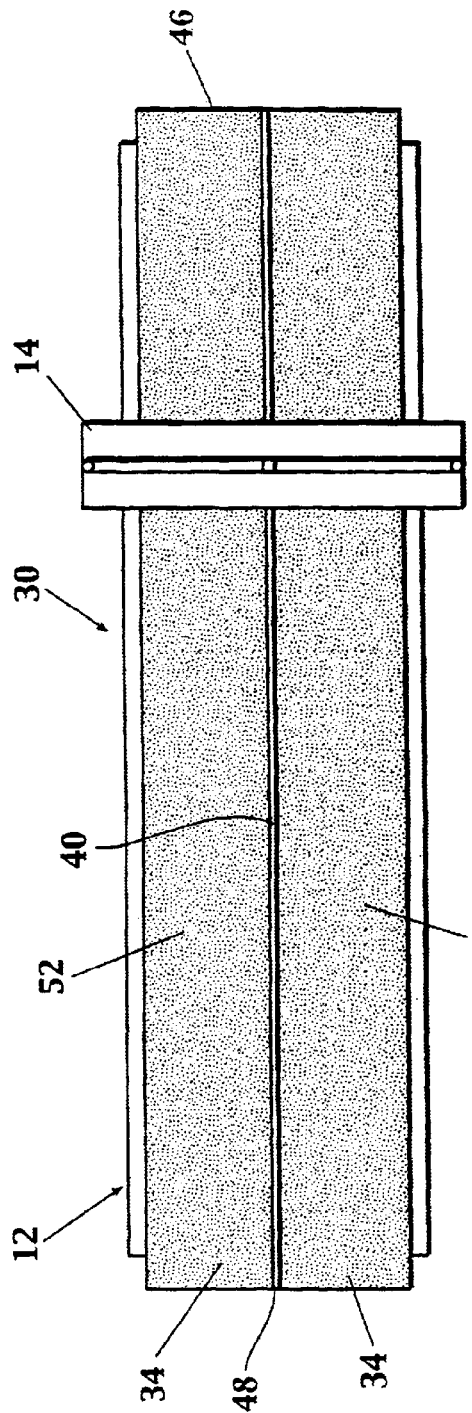
FIG. 11 provides a plan view of inventive apparatus 30.
Figure 10:
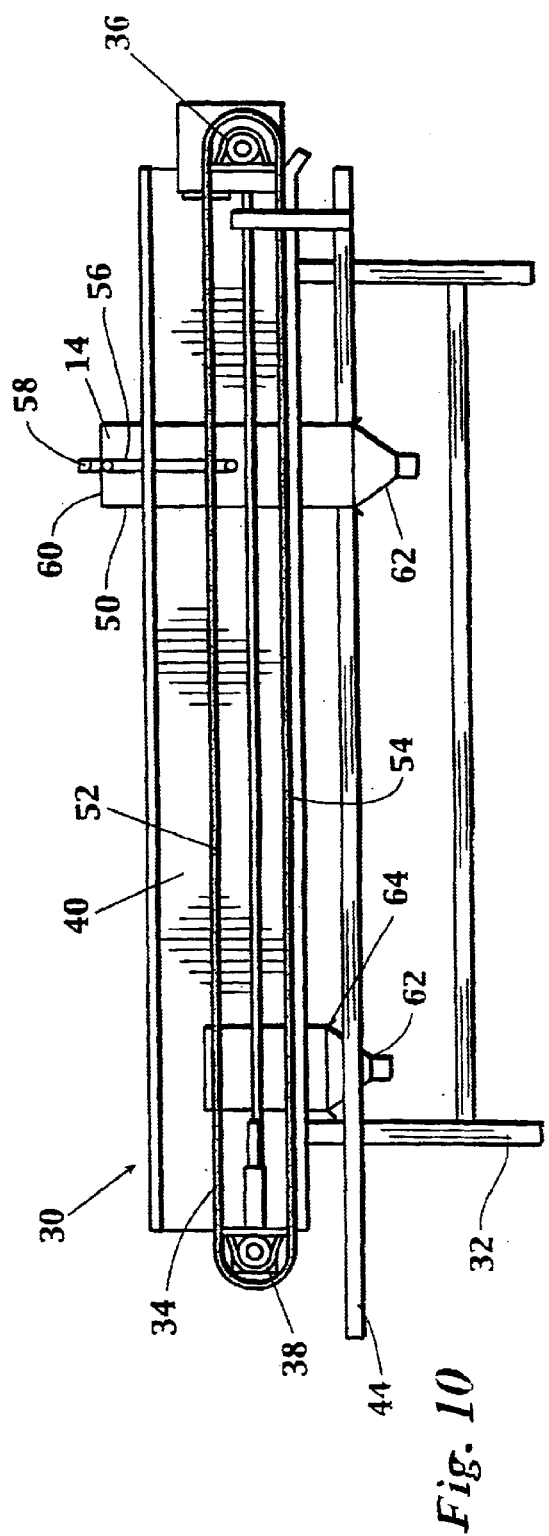
FIG. 10 provides an elevational side view of an inventive combination transfer conveyor and washing apparatus 30 preferred for use in inventive system 2.
Figure 13:
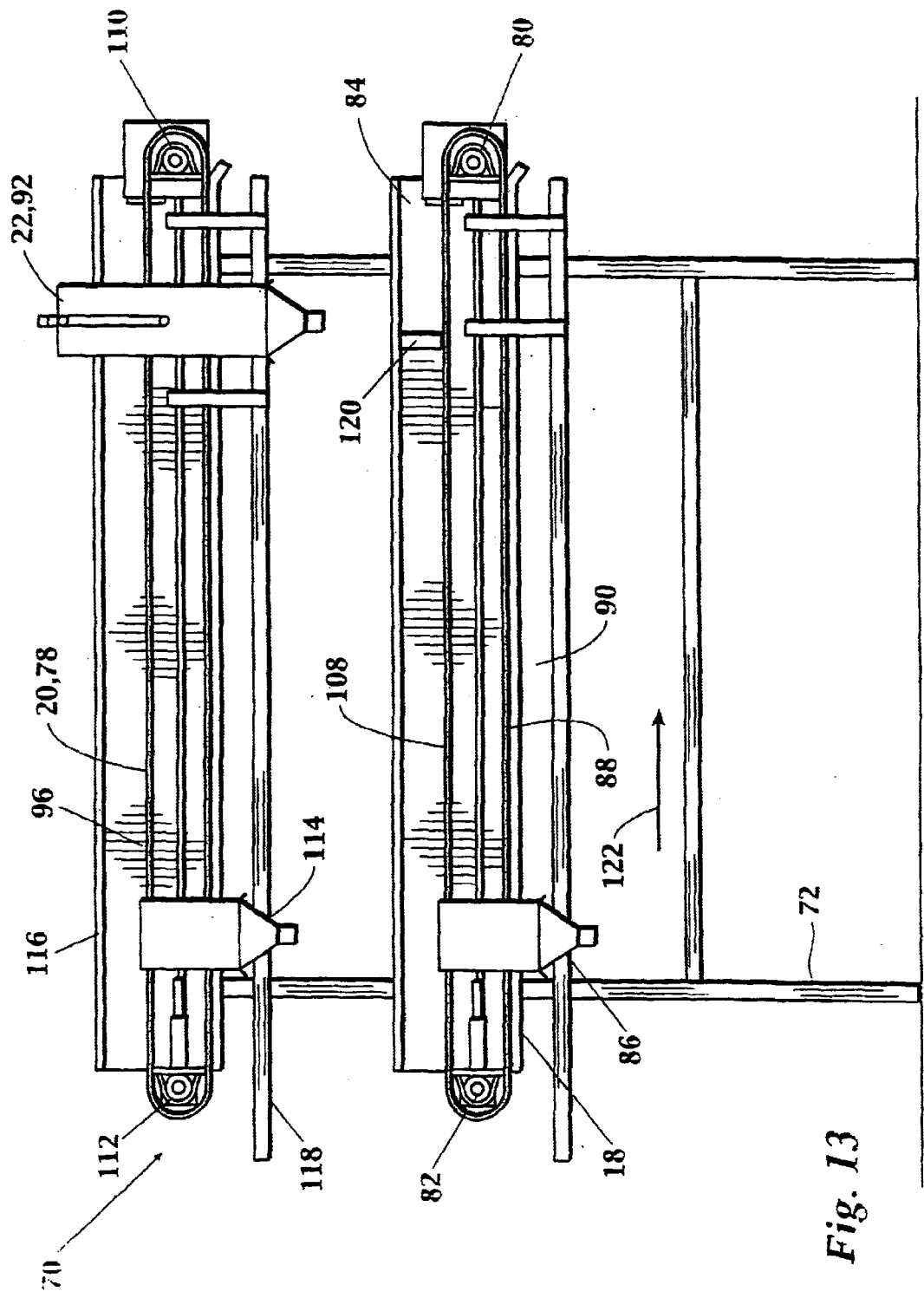
FIG. 13 provides an elevational side view of an inventive inspection conveyor and reconditioning apparatus 70 preferred for use in inventive system 2.
Figure 15:
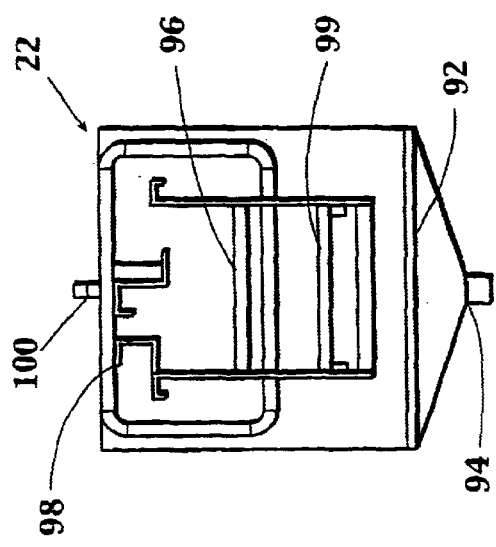
FIG. 15 provides an elevational view of the reconditioning washer 22 employed in inventive apparatus 70.
Figure 14:
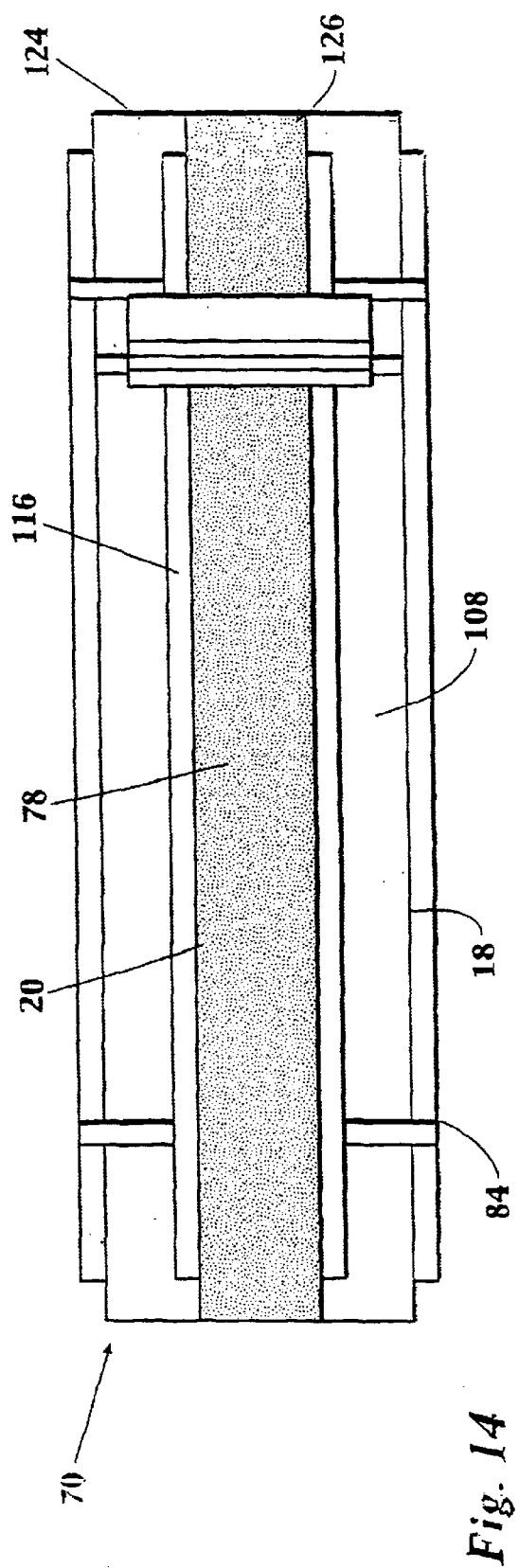
FIG. 14 provides a plan view of inventive apparatus 70.
Figure 16:
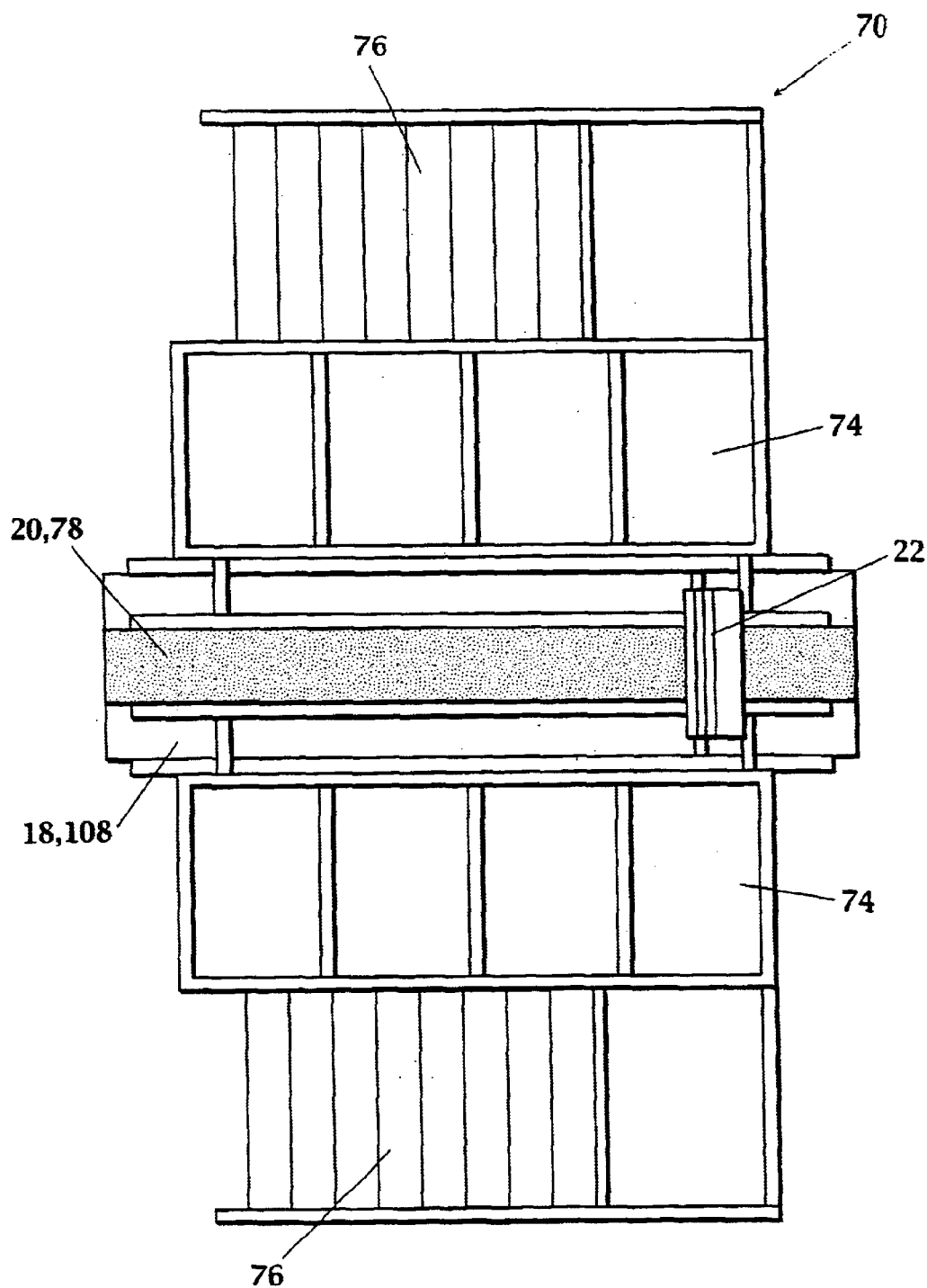
FIG. 16 provides a plan view of inventive apparatus 70 with inspection stands 74 added thereto.

An inventive embodiment 30 of a combined transfer conveyor 12 and final washing system 14 is depicted in FIGS. 10 and 11. Inventive device 30 is particularly well-suited for use in inventive system 2. The transfer conveyor 12 employed in inventive device 30 preferably comprises: a support frame 32; a pair of parallel horizontal conveyor belts 34 rotatably mounted on support frame 32; a pair of drive motors 36 (preferably hydraulic or electric and most preferably hydraulic) mounted at one end of conveyor 12 for independently driving the two conveyor belts 34; a pair of rollers or other typical conveyor supports 38 provided at the other end of conveyor 12 for guiding the rotation thereof; an elongate vertical divider wall 40 extending between the two conveyor belts 34; a pair of elongate vertical outside walls 42 provided on each side of conveyor 12; and a drip pan or tray 44 extending beneath the conveyor belts 34 for catching any drips or leakage from the belts, motors, or washing systems.

It will be apparent to those skilled in the art that transfer conveyor 12 could alternatively comprise only a single conveyor belt. However, it is preferred that transfer conveyor 12 comprise a pair of separate, independently operated, conveyor motor systems so that (a) transfer conveyor 12 can receive fronts simultaneously from two separate processing lines and/or, (b) should a problem occur in one of the two lines, the belt 34 receiving fronts from that line can be reversed without disrupting the flow of fronts to the pre-chiller 16 from the other processing line. As shown in FIG. 11, both the pre-chiller end 46 and the other end 48 of conveyor 12 are open so that, if a problem occurs with one processing line and the direction of the belt 34 receiving fronts from that line is reversed, the fronts received by the reversed belt 34 can be delivered into collection tubs or bins (not shown) positioned beneath end 48 of conveyor 12.

The final wash system 14 incorporated in inventive device 30 preferably comprises: a stationary lateral housing 50 through which the conveyor sidewalls 42, the conveyor divider wall 40 and both the carrying (upper) runs 52 and return (lower) runs 54 of conveyor belts 34 are received; a rectangular lateral spray conduit 56 secured within lateral housing 50 and surrounding the upper carrying runs 52 of conveyor belts 34 and having nozzles or apertures provided therein for spraying chlorinated water both upwardly and downwardly onto the fronts 5 being carried on belts 34; and a chlorinated water feed inlet 58 preferably provided at the top of lateral spray conduit 56 and projecting upwardly through the top 60 of lateral housing 50. Rectangular spray conduit 56 is of sufficient height to allow fronts 5 to pass therethrough as they are carried on belts 34. The bottom of lateral housing 50 is preferably configured as shown in FIGS. 10 and 12 to provide a sloped outlet drain 62. The belt(s) 34 employed in transfer conveyor 12 are preferably open mesh belts or other types of belts having openings, perforations, or spaces provided therein which will allow chlorinated water delivered upwardly from the bottom run of spray conduit 56 to travel through belts 34 and into contact with the fronts 5 being conveyed thereon.

Although the wash water employed in final wash 14 has been referred to as chlorinated water, it will be understood by those skilled in the art that any type of anti-microbial reconditioning rinse can be used. A standard chlorinated water rinse will typically have a chlorine concentration of about 30 ppm by volume.

The inventive transfer and washing device 30 preferably also includes at least one belt-washing system 64. Belt-washing system 64 preferably comprises a lateral housing 66 and an internal spray conduit, each similar in construction and operation to those employed in final wash system 14; however, the housing 66 and internal spray conduit employed in belt-washing system 64 are preferably shorter than those employed in final wash system 14 such that the spray system surrounds and washes only the top and bottom sides of the return (lower) runs 54 of conveyor belts 34. The belt-washing system will preferably employ the same anti-microbial rinse material as is used in final wash system 14.

The washed fronts 5 dropping from the distal end(s) 46 of conveyor belt(s) 34 preferably fall onto a chute and slide into the pre-chiller 16. The pre-chiller 16 will preferably be operable for lowering the temperature of the fronts 5 to less than 80° F. and will more preferably be operable for lowering the temperature of the fronts 5 to less than 75° F. Reducing the temperature of fronts 5 in this manner is particularly desirable in that it both (a) standardizes the temperature of fronts 5 prior to delivery into aging chiller 24 and (b) reduces the heat load carried by fronts 5 into the inlet end of aging chiller 24 by from about 15° F. to about 20° F. The inventive system thus provides more cooling and more consistent results than would otherwise be achieved with only an aging chiller 24.

Although other known types of continuous water chillers or other types of continuous chilling systems can be employed, the pre-chiller 16 employed in inventive system 2 will preferably be a continuous auger-type water chiller. Such devices are well-known in the art and are particularly well suited for rapidly cooling the fronts 5 using a relatively small volume of cold water. By way of example, a typical auger-type pre-chiller will commonly contain only about 7,000 gallons of cold water. Thus, in the event that a fecal failure is detected at inspection station 15, the water within pre-chiller 16 can typically be replaced with clean cold water in about 15 minutes or less. While the water in pre-chiller 16 is being replaced and until a subsequent zero-tolerance inspection indicates that the fronts 5 are acceptable for continued processing, the fronts 5 will be reconditioned in reconditioning wash 22.

The water in pre-chiller 16 will typically have an average temperature in the range of from about 55° F. to about 65° F. and will preferably include an amount of disinfecting agent, preferably chlorine, sufficient to deter microbial growth. The chilled water employed in prechiller 16 will preferably include chlorine at a concentration of about 20 ppm by volume. The residence time of front halves 5 within pre-chiller 16 will preferably be less than 45 minutes and will typically be in the range of from about 15 to about 30 minutes.

In a particularly preferred embodiment of the present invention, the inspection conveyor 18, reconditioning conveyor 20, and reconditioning wash 22 are combined together in a single inspection and reconditioning apparatus 70. In inventive apparatus 70, reconditioning conveyor 20 and reconditioning wash 22 are preferably mounted with and above inspection conveyor 18 on a support frame 72. In this arrangement, the upper reconditioning conveyor 20 is preferably narrower in width than the lower inspection conveyor 18 in order to facilitate the visual inspection of the fronts 5 as they are carried by lower conveyor 18. Additionally, in order to further facilitate the transfer and visual inspection processes, elevated inspection stands 74 and associated stairways 76 are preferably provided on each side of inventive apparatus 70.

The reconditioning conveyor 20 and reconditioning wash 22 included in inventive apparatus 70 are essentially identical to transfer conveyor 12 and final wash 14. Like transfer conveyor 12, the reconditioning conveyor 20 can optionally include a plurality of conveyor belts separated by one or more elongate vertical divider walls. However, reconditioning conveyor 20 preferably comprises only a single conveyor belt 78. Otherwise, like transfer conveyor 12 and final wash 14, reconditioning conveyor 20 and reconditioning wash 22 preferably comprise: a belt drive motor 110 provided at one end of belt 78; a belt roller 112 provided at the other end of belt 78; a pair of vertical elongate side walls 116; a belt washer 114 which washes the lower run 88 of belt 78; a drip pan or tray 118 positioned between reconditioning conveyor 20 and inspection conveyor 18; a lateral washer housing 92 equipped with a sloped bottom drain 94 and having carrying run 96, return run 99, and conveyor side walls 116 extending therethrough; and a rectangular spray conduit 115 extending around the upper carrying run 96 and sidewalls 116 of reconditioning conveyor 20 and having upper and lower orifices, nozzles, or other spray elements provided therein and an upper water inlet 100. All of these features are essentially identical in structure and arrangement to the corresponding features found in the inventive transfer and final washing apparatus 30 described above. Additionally, like the transfer conveyor belt(s) 34, the reconditioning conveyor belt 78 is preferably either an open mesh belt or other type of perforated or slotted belt which will allow wash water to travel therethrough.

As with reconditioning conveyor 20, the lower inspection conveyor 18 comprises: a conveyor belt 108; a drive motor 80; a belt roller 82 installed at the opposite end of belt 108; a belt washer 86; belt side walls 84; and a drip pan or tray 90. Except for the larger width of inspection conveyor belt 108 and the absence of a product washer, all of these features are essentially identical to the corresponding features found in reconditioning conveyor 20. Inspection conveyor 18 further comprises a pair of opposing slots or other retainers 120 attached to or formed in the conveyor side walls 84. The slots or holders 120 are sized and positioned for removably securing a blocking board laterally across the width of inspection conveyor 18 in order to block the travel of fronts 5 in the event that a primary inspection failure occurs.

During normal operation, the pre-chilled fronts 5 are dropped onto inspection conveyor 18 and are conveyed by inspection conveyor 18 in direction 122 directly to chiller 24. However, if an inspection failure is detected at primary station 15, the travel of the fronts 5 on inspection conveyor 18 will be blocked, using a blocking board as mentioned above, and the fronts 5 thus accumulating on inspection conveyor 18 will be transferred by hand to the upper reconditioning conveyor 20 and an additional visual inspection of the product surfaces will preferably be conducted. As they are carried on reconditioning conveyor 20, the fronts 5 are rewashed as they pass through reconditioning wash 22. Reconditioning wash 22 will typically utilize an anti-microbial rinse of the same type employed in final wash 14. The same type of anti-microbial rinse will also typically be employed in each of the belt washers 86 and 114. The blocking of inspection conveyor 18 and the reconditioning of fronts 5 will preferably be continued in this manner until the primary zero-tolerance check indicates that the front halves 5 are acceptable for continued processing and the water in pre-chiller 16 has been turned over (i.e., replaced) with fresh water.

The fronts dropping from either the distal end 124 of inspection conveyor 18 or the distal end 126 of reconditioning conveyor 20 will typically simply fall onto an appropriately positioned chute and then slide into primary aging chiller 24. The front halves 5 are preferably aged in the first and second aging chillers 24 and 26 for a period of time effective for tenderizing the meat sufficiently for delivery directly to a deboning system or other downstream processing unit. The product is preferably chilled and aged in chillers 24 and 26 at temperatures meeting USDA requirements and is most preferably processed in the presence of a medium which controls and reduces microbial populations. Each of chillers 24 and 26 most preferably uses chilled water having an average temperature in the range of from about 30° F. to about 35° F. and an amount of an anti-microbial agent (preferably about 30 ppm by volume of chlorine) effective to control and reduce microbial populations.

Although other types of continuous chillers can also be used, the aging chillers 24 and 26 employed in the inventive chilling and aging system 2 are preferably large, elongate tub-type chillers of a type known in the art wherein the product is continuously conveyed through the cold water medium from the inlet end to the outlet end of the tub by a series of large paddles. The fronts 5 will preferably be chilled in chillers 24 and 26 to a final temperature in the range of from 32° F. to about 35° F. The total residence time of the product within chillers 24 and 26 will typically be in the range of from about four to about seven hours. Residence time within the first chiller 24 will typically be in the range of from about 1.25 hours to about 3 hours and preferably will be in the range of from about 1.75 hours to about 2.25 hours. Residence time in the second chiller 26 will typically be in the range of from about 1.5 hours to about 4 hours and will preferably be in the range of from about 3 hours to about 4 hours.

If desired, a single aging chiller could be employed in the inventive system. However, because of the enormous size of the chillers and the volume of water required, it is preferred that at least two chillers 24 and 26, operating in series, be used. The use of a series of chillers rather than one enormous unit is preferred in order to (a) allow the water to be chilled and turned over more quickly, (b) reduce the amount of product which must be reconditioned or is lost if one of the chillers malfunctions, and (c) more readily adapt to the floor space available.

The primary halving apparatus 8 employed in inventive system 2 can be similar to the above-described device of U.S. Pat. No. 4,593,435. However, the longer evisceration shackles 15 preferred for use in this case can cause significant stability problems.

Figure 3:
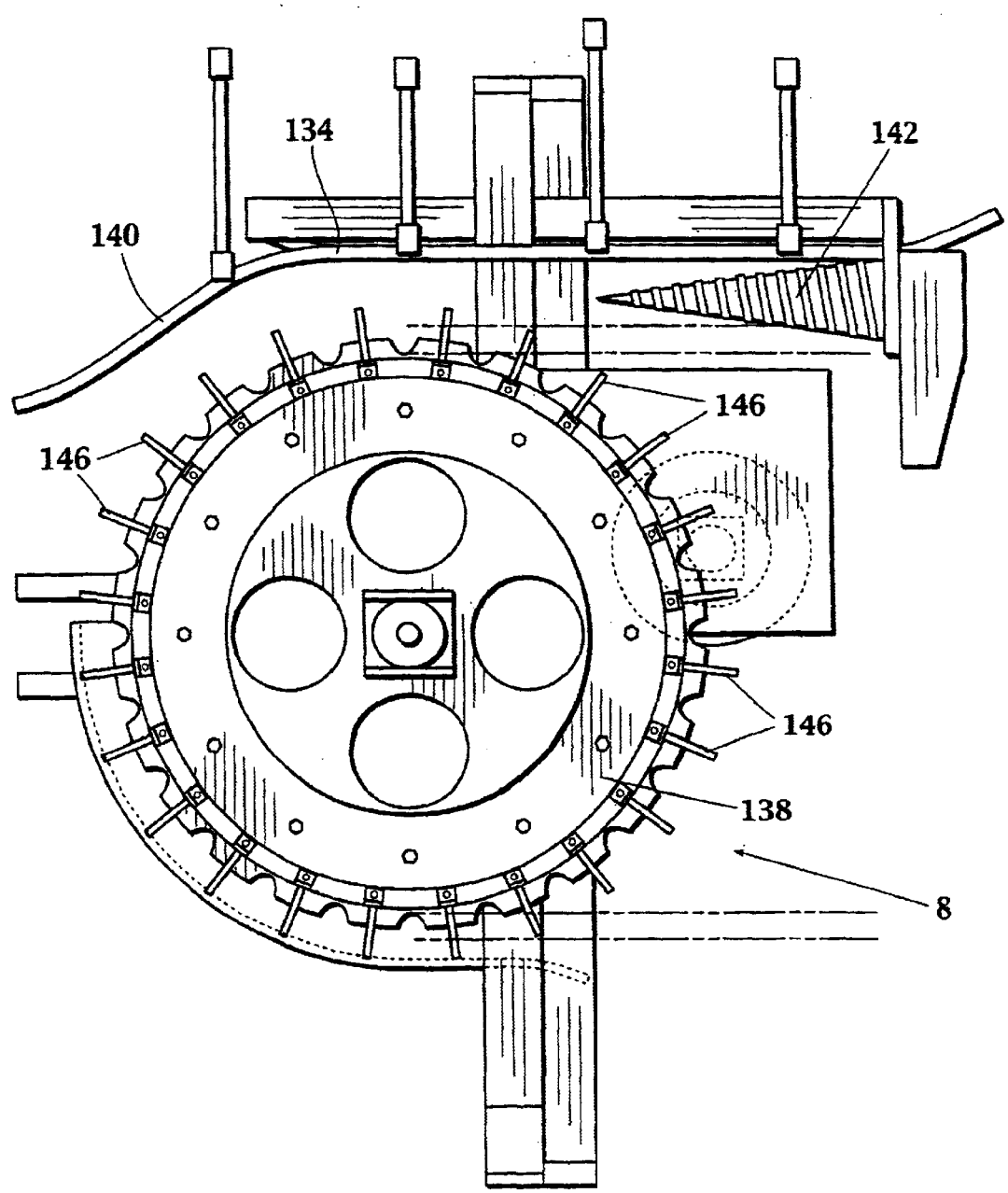
FIG. 3 provides a plan view of primary halving apparatus 8.
Figure 4:
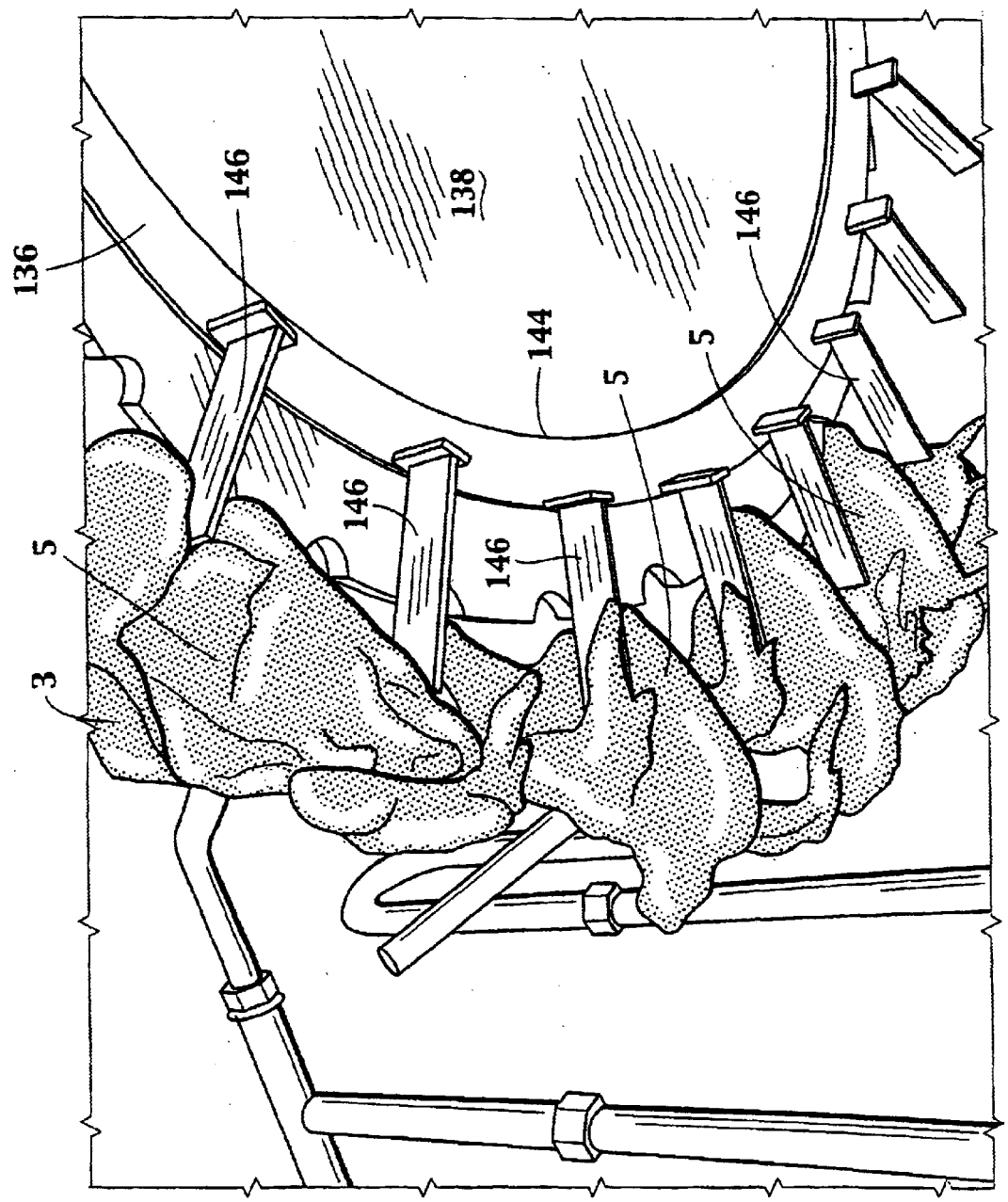
FIG. 4 provides a bottom view of primary halving apparatus 8.
Figure 6:
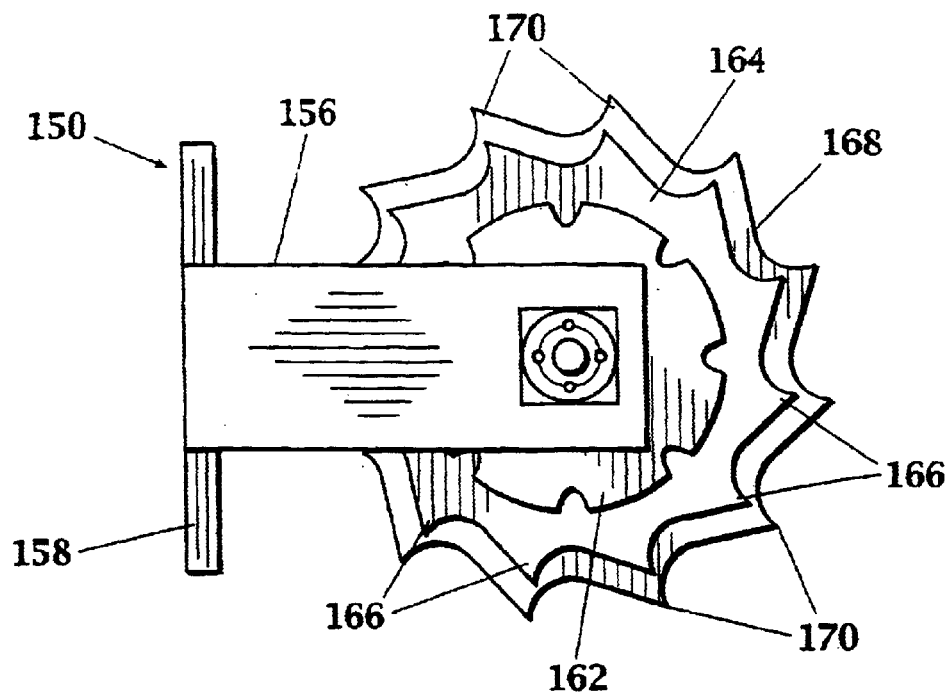
FIG. 6 provides a top view of prior art secondary halving apparatus 150.
Figure 5:
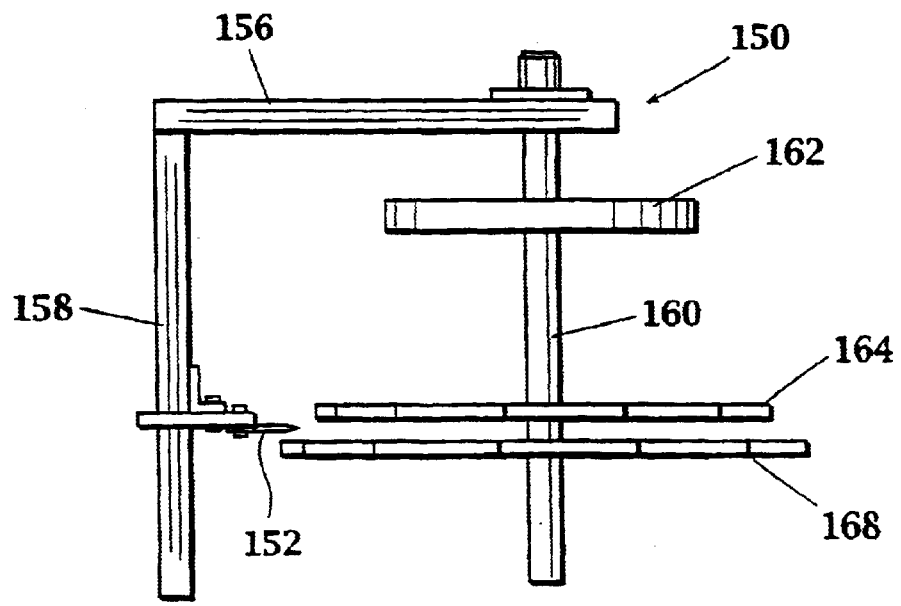
FIG. 5 provides an elevational front view of a prior art secondary halving apparatus 150.

An alternative primary halving apparatus 8 of a type particularly well-suited for use in the inventive system 2 is depicted in FIGS. 2–4. This apparatus is similar to the device of U.S. Pat. No. 4,593,435 in terms of the structure and operation except that: (a) the center shaft 130 of apparatus 8 has been lengthened to accommodate the longer evisceration shackles 132; (b) the leg space conveyor of the U.S. Pat. No. 4,593,435 device has been replaced with a stationary bar, rod, or other similar elongate guiding member 134; and (c) a finger plate 136 has been attached to the bottom of the star wheel (or cog wheel) 138. The new guide bar 134 includes a curved outer end 140 for receiving the carcasses 3 as they are conveyed by shackle conveyor 4 and guiding the carcasses 3 into engagement with star wheel 138. The backs of the carcass 3 contact and slide along bar 134 during the cutting operation and are also firmly supported by bar 134 against the tensioning force applied by star wheel 138. After the cutting operation, bar 134 also assists in guiding the carcasses 3 into engagement with the conical auger 142.

The finger plate 136 employed in apparatus 8 preferably comprises a flat ring 144, secured to the bottom of star wheel 138, and an array of indexing fingers 146 secured to ring 144 such that they project radially from star wheel 138. As the carcasses 3 are delivered to star wheel 138, they are received between indexing fingers 146 so that fingers 146 assist in moving, indexing, and properly orienting the carcasses for the cutting operation.

The secondary halving apparatus 10 employed in inventive system 2 is preferably substantially similar in structure and operation to the prior art system 150 described hereinabove. However, the apparatus 10 employed in inventive system 2 preferably utilizes an inventive indexing assembly 180 designed to accommodate the longer evisceration shackles 132.

Figure 9:
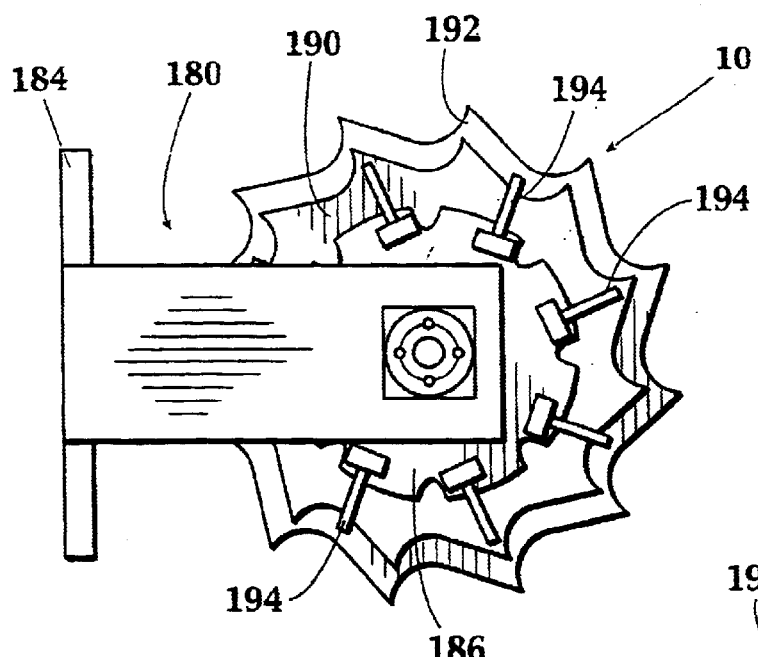
FIG. 9 provides a plan view of secondary halving apparatus 10.
Figure 8:
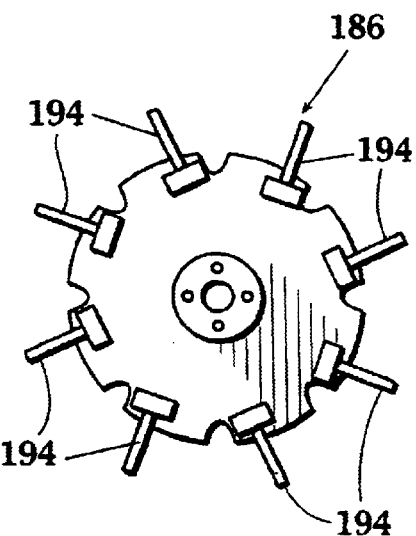
FIG. 8 provides a plan view of an indexing wheel 186 employed in secondary halving apparatus 10.
Figure 7:
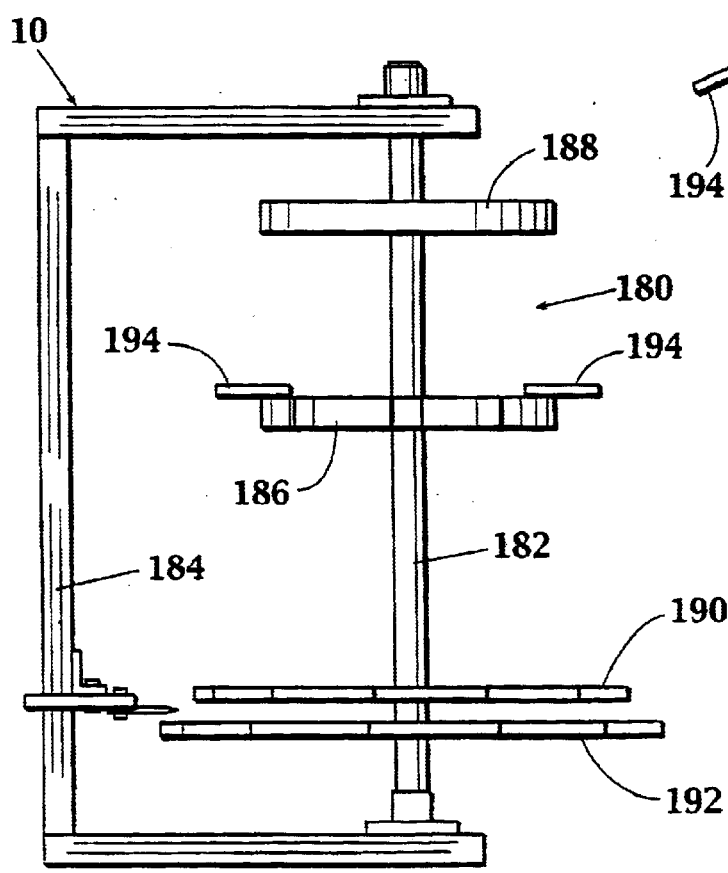
FIG. 7 provides a front elevational view of an inventive secondary halving apparatus 10 preferred for use in inventive system 2.

The inventive indexing assembly 180 is illustrated in FIGS. 7–9. Inventive indexing assembly 182 is similar in structure and operation to the prior art indexing assembly 156 except that the length of center shaft 180 and the vertical height of support boom 184 have been increased and an additional new indexing wheel 186 is secured on center shaft 182 between the chain drive wheel 188 and the indexing wheels 190 and 192. The added indexing wheel 186 includes an array of radially projecting index fingers 194 which engage of the evisceration shackles 132 and thereby assist in indexing and pulling the longer evisceration shackles through the cutting operation.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A process for chilling and aging front portions of poultry carcasses comprising the steps of:

(a) separating eviscerated poultry carcasses into front portions and back portions in a manner such that said front portions are completely separated from and are no longer connected to said back portions and said front portions do not include any legs;

(b) then conducting a fecal inspection of at least some of said front portions;

(c) pre-chilling said front portions in water; and (d) then chilling and aging said front portions.

2. The process of claim 1 wherein said front portions are pre-chilled in step (c) by continuously conveying said front portions through an auger chiller.

3. The process of claim 1 wherein said front portions are chilled and aged in step (d) in water.

4. The process of claim 3 wherein said front portions are chilled and aged in step (d) by continuously conveying said front portions through at least one tub chiller.

5. The process of claim 1 further comprising the step, after step (a) and prior to step (b), of washing said front portions.

6. The process of claim 5 wherein said front portions are washed in said step of washing using chlorinated water.

7. The process of claim 5 further comprising the step, after step (c) and prior to step (d), when said fecal inspection of step (b) detects a failure, of delivering said front portions through a reconditioning wash and then to step (d).

8. The process of claim 7 further comprising the step, after step (c) and prior to step (d), of conducting a secondary fecal inspection at said reconditioning wash.

\* \* \* \* \*